(12) United States Patent
Old et al.

(10) Patent No.: US 9,244,885 B1
(45) Date of Patent: Jan. 26, 2016

(54) PIPELINED PHASE ACCUMULATOR

(71) Applicant: Xilinx, Inc., San Jose, CA (US)

(72) Inventors: Gordon I. Old, Balerno (GB); Andrew Whyte, Edinburgh (GB)

(73) Assignee: XILINX, INC., San Jose, CA (US)

( * ) Notice: Subject to any disclaimer, the term of this patent is extended or adjusted under 35 U.S.C. 154(b) by 419 days.

(21) Appl. No.: 13/837,050

(22) Filed: Mar. 15, 2013

(51) Int. Cl.
*G06F 17/10* (2006.01)

(52) U.S. Cl.
CPC ..................................... *G06F 17/10* (2013.01)

(58) Field of Classification Search
None
See application file for complete search history.

(56) References Cited

U.S. PATENT DOCUMENTS

| | | | | |
|---|---|---|---|---|
| 5,408,673 | A  * | 4/1995 | Childers et al. | 711/149 |
| 7,027,597 | B1 * | 4/2006 | Stojancic et al. | 380/28 |
| 7,027,598 | B1 * | 4/2006 | Stojancic et al. | 380/28 |
| 2008/0025502 | A1 * | 1/2008 | Kounavis et al. | 380/30 |

* cited by examiner

*Primary Examiner* — Michael D Yaary
(74) *Attorney, Agent, or Firm* — W. Eric Webostad (57) ABSTRACT

An apparatus relating generally to accumulation is disclosed. In this apparatus, a first subtraction-bypass stage is coupled to receive an input operand and a modulus operand to provide a first difference and the input operand. An accumulation stage is coupled to the first subtraction-bypass stage to receive the first difference and the input operand. The accumulation stage is coupled to receive an offset operand for providing an offset-accumulated result. A second subtraction-bypass stage is coupled to receive the offset operand and the modulus operand to provide a second difference and the offset operand. A consolidation stage is coupled to receive the offset operand, the second difference and the offset-accumulated result to provide a consolidated accumulated result. The first subtraction-bypass stage, the accumulation stage, the second subtraction-bypass stage, and the consolidation stage are for a redundant number system.

20 Claims, 9 Drawing Sheets

| Clock 205 Cycle | Incr. Phase Value 201 | Modulus Value 207 | Diff. Result 301 | Mux. Output 304 | Carry Value 306C | Sum Result 305 | Offset Value 330 | Acc. Phase Value 306 | Diff. Result 381 | Mux. Output 389 | Adder Output 309 |
|---|---|---|---|---|---|---|---|---|---|---|---|
| 0 | 5 | 12 | -7 | 5 | 0 | 9 | 4 | 4 | -16 | -4 | 0 |
| 1 | 5 | 12 | -7 | 5 | 0 | 14 | 4 | 9 | -16 | -4 | 5 |
| 2 | 5 | 12 | -7 | 5 | 0 | 19 | 4 | 14 | -16 | -4 | 10 |
| 3 | 5 | 12 | -7 | -7 | 1 | 12 | 4 | 19 | -16 | -16 | 3 |
| 4 | 5 | 12 | -7 | 5 | 0 | 17 | 4 | 12 | -16 | -4 | 8 |
| 5 | 6 | 12 | -6 | -6 | 1 | 11 | 4 | 17 | -16 | -16 | 1 |
| 6 | 6 | 12 | -6 | 6 | 0 | 17 | 4 | 11 | -16 | -4 | 7 |

PIPELINED PHASE ACCUMULATOR

FIELD OF THE INVENTION

The following description relates to integrated circuit devices ("ICs"). More particularly, the following description relates to a pipelined phase accumulator for an IC.

BACKGROUND

In a conventional Direct Digital Synthesizer ("DDS"), there is a phase accumulator ("accumulator") and a sine/cosine lookup table ("lookup table"). Phase accumulation is conventionally implemented modulus $2^N$, where N is a width of the accumulator. Because the range 0 to $2^N-1$ describes a full circle of phase, simply discarding carry-out information performs a modulus $2^N$ operation and maps phase angles above 360 degrees back into the range of 0 to 360 degrees.

A conventional DDS may be an N-bit device, where N is large. For example, N may be 48 bits. A large value for N is used to provide precise frequency resolution. However, generally only most significant bits ("MSBs") of the output of such a DDS may be passed to a lookup table, such as in a non-rasterizing DDS for example. By using only the MSBs, and thus truncating the least significant bits ("LSBs"), address size is reduced. In other words, the amount of random access memory ("RAM") may be reduced to control cost.

However, phase noise generate by such truncation can be problematic. Along those lines, to remove such phase noise, exact phase values may be applied to such a lookup table. Unfortunately, heretofore, this meant that either multiple layers of logic were used in an accumulator feedback path or, for an accumulator feedback path to have a latency of greater than one, multiple channels were interlaced.

Accordingly, it would be useful to provide a phase accumulator that overcomes one or more the above-described limitations.

SUMMARY

An apparatus relates generally to accumulation. In such an apparatus, a first subtraction-bypass stage is coupled to receive an input operand and a modulus operand to provide a first difference and the input operand. An accumulation stage is coupled to the first subtraction-bypass stage to receive the first difference and the input operand. The accumulation stage is coupled to receive an offset operand for providing an offset-accumulated result. A second subtraction-bypass stage is coupled to receive the offset operand and the modulus operand to provide a second difference and the offset operand. A consolidation stage is coupled to receive the offset operand, the second difference and the offset-accumulated result to provide a consolidated accumulated result. The first subtraction-bypass stage, the accumulation stage, the second subtraction-bypass stage, and the consolidation stage are for a redundant number system.

Another apparatus relates generally to accumulation. In such an apparatus, a first accumulation stage is coupled to receive an offset operand and a carry value fed back to provide a first sum result. A second accumulation stage is coupled to the first accumulation stage to receive the first sum result. The second accumulation stage is configured to select between the first sum result and the carry value fed back responsive to the carry value to provide a first input to an adder. The second accumulation stage is coupled to receive an input operand as a second input to the adder to provide a second sum result. The second accumulation stage includes a register stage to register the second sum result to provide an offset-accumulated result. A subtraction-bypass-register stage is coupled to receive the offset operand and a modulus operand to provide a registered difference and a registered offset operand. A consolidation stage is coupled to receive the registered offset operand, the registered difference and the offset-accumulated result to provide a consolidated accumulated result.

Another apparatus relates generally to accumulation. In such an apparatus, an addition-bypass stage is coupled to receive an input operand and an offset operand to provide a sum and the input operand. An accumulation stage is coupled to the addition-bypass stage to receive the sum and the input operand to provide an offset-accumulated result. A subtraction-bypass stage is coupled to receive the offset operand and the modulus operand to provide a difference and the offset operand. A consolidation stage is coupled to receive the offset operand, the difference and the offset-accumulated result to provide a consolidated accumulated result. The addition-bypass stage, the accumulation stage, the subtraction-bypass stage, and the consolidation stage are for a redundant number system.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 9-1 and 9-2 are block/circuit diagrams depicting respective exemplary potions of other phase accumulators.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Again, in a conventional Direct Digital Synthesizer ("DDS"), there is a phase accumulator ("accumulator") and a sine/cosine lookup table ("lookup table"). Phase accumulation is conventionally implemented modulus $2^N$, where N is a width of the accumulator. An accumulated phase in many systems can be of a width such that a direct lookup into a lookup table, such as in a form of random access memory ("RAM") for example, to obtain sine and/or cosine values corresponding to phase information is prohibitive in terms of RAM. Instead, conventionally only most significant bits ("MSBs") of an accumulated phase signal are used to reference a lookup table. The lower bits, such as least significant bits ("LSBs") for example, are either discarded or used to correct an output from such lookup table. Because such truncated bits often describe a sawtooth waveform, a phase error of a simple truncate-and-lookup system can result in the energy of this phase error signal being concentrated into specific "spurii" frequencies of an output waveform. To combat this, white noise can be applied to an accumulated phase before truncation so as to distribute error signal energy thereof across a spectrum, namely dithering.

For phase noise generated by truncation to be eliminated, phase values applied to a lookup table are to be exact. To achieve this, the modulus of a phase accumulation may not be a power of 2, when, for example, the ratio of a desired frequency to a system clock frequency is not a rational fraction with $2^N$ as a denominator. Unlike a counter with constant inputs, where a rollover instant may be predicted in advance, input to an accumulator is dynamic, such as for example variation of an input signal related to frequency modulation.

As described below in additional detail, a phase accumulator for DDS or a Numerically Controlled Oscillator ("NCO") or other device having an accumulator has a modulus which is not limited to a power of 2. Along those lines, such accumulator is architected such that logic can be fully pipelined and non-interlaced, namely that each stage may have no more than a single layer of logic. This phase accumulator relates more specifically to design of digital circuits whose function is to generate a sinusoidal signal, such as for example for use in radio systems. In such digital circuits, a DDS for example generates a signal which is used to mix, such as by complex multiplication, signals from different data paths. However, more generally, a phase accumulator, or more generally an accumulator, as described herein allows for implementation of a DDS which has a modulus which is not a power of 2, and which may be used to achieve very high clock speeds.

With the above general understanding borne in mind, various embodiments for a phase accumulator are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
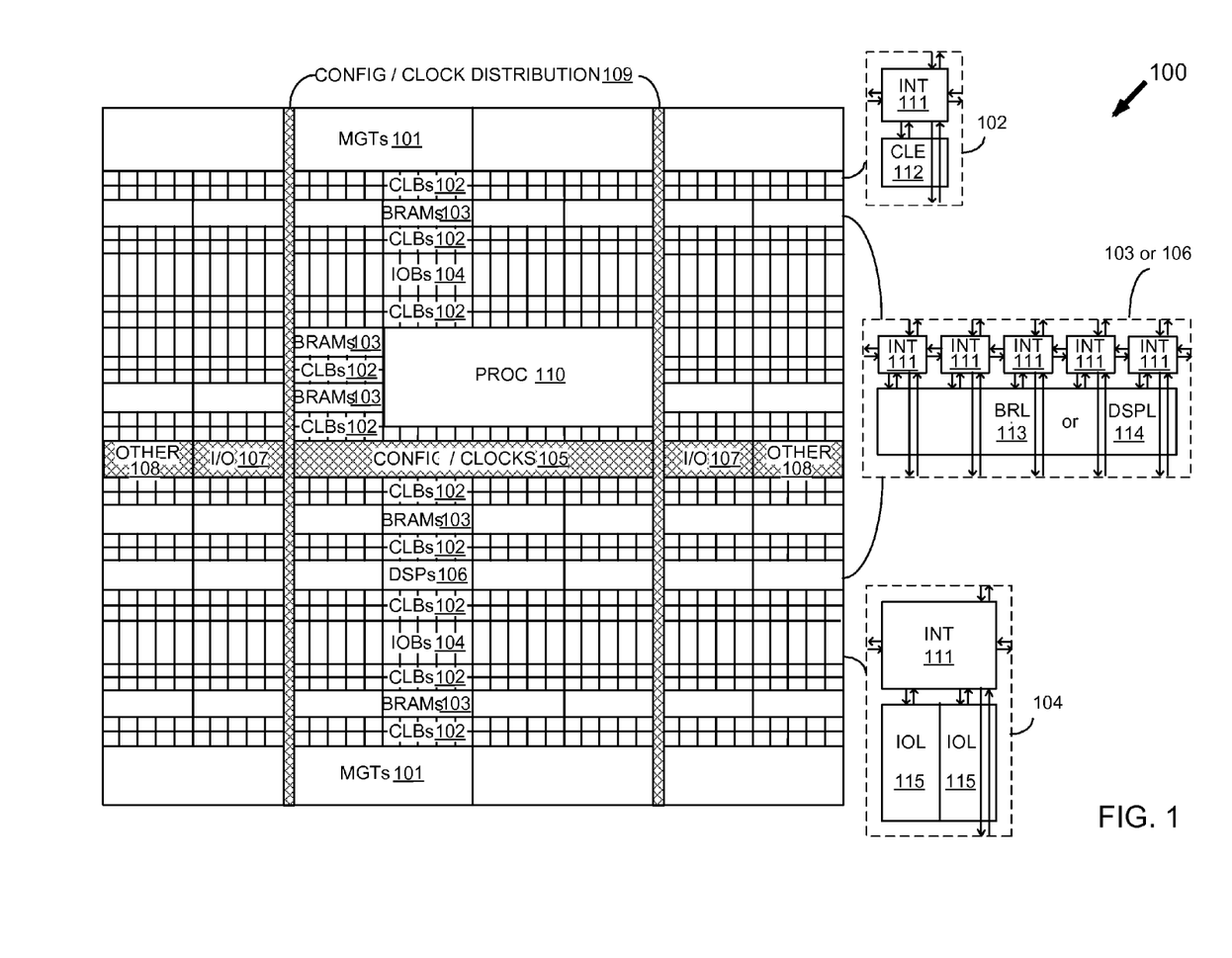
FIG. 1 is a simplified block diagram depicting an exemplary columnar Field Programmable Gate Array ("FPGA") architecture.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
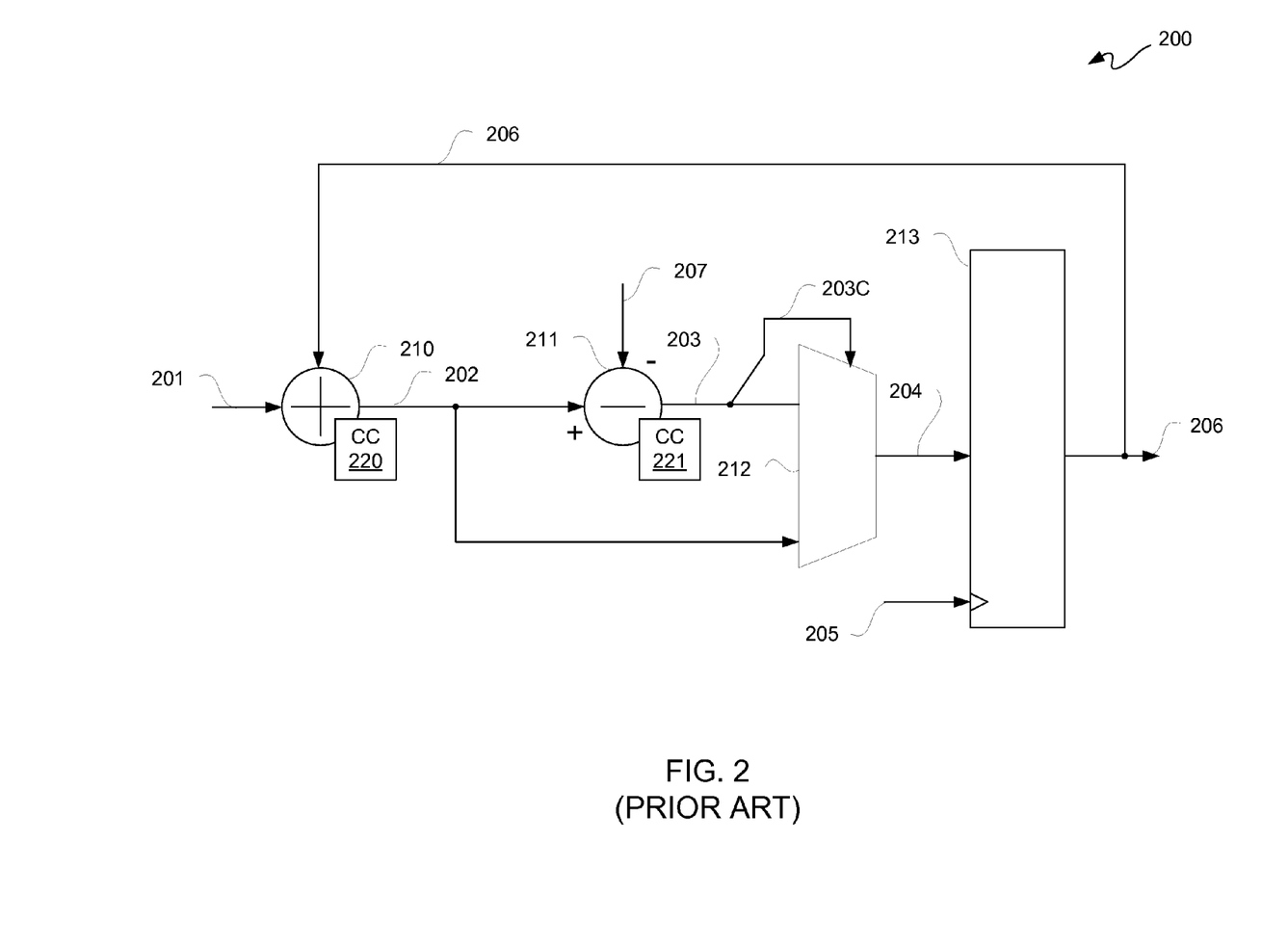
FIG. 2 is a block/circuit diagram depicting an exemplary conventional phase accumulator.

FIG. 2 is a block/circuit diagram depicting an exemplary conventional modulo-X phase accumulator 200, where X is not a power of 2. Phase accumulator 200 includes an adder 210, a subtractor 211, a multiplexer 212, and a register stage 213. The term "register stage" as used herein includes one or more registers in one or more sets of registers. Adder 210 includes a carry chain ("CC") 220, and subtractor 211 includes a carry chain 221. Additionally, for purposes of clarity and not limitation, signals and values or operands of such signals are used interchangeably.

Phase accumulator 200 includes three levels of logic, namely adder 210, followed by subtractor 211, which is followed by multiplexer 212, prior to register stage 213. Register stage 213 is general not considered a logic level, and may be used in a pipelined architecture. Moreover, for a pipelined architecture, an incremental input value 201 may be registered prior to input to adder 210 of phase accumulator 200.

An incremental input value ("input operand") 201 is added to a feedback accumulated value ("accumulated operand") 206 by adder 210. A sum result 202 of such addition may be provided as output from adder 210. Sum result 202 may be provided as an input to subtractor 211 and as a data input to multiplexer 212. Also provided as an input to subtractor 211 may be a modulus operand 207. A difference result 203 of such subtraction may be provided as an output from subtractor 211. Difference result 203 may be provided as another data input to multiplexer 212. A carry value, such as a carry bit value for example, 203C of such difference result 203 may be input as a control select to multiplexer 212.

Effectively, a sum result 202 is compared to modulus operand 207 as follows. If such sum result 202 is out of limits, namely exceeds a highest value of modulus operand 207, as indicated by a difference result 203, then multiplexer 212, responsive to a carry value 203C thereof, provided to a control select port thereof, selects such difference result 203 for multiplexer output 204. If, however, such sum result 202 is not out of limits as compared with modulus operand 207 as indicated by such difference result 203, then multiplexer 212, responsive to carry value 203C provided to a control select port thereof, selects such sum result 202 for multiplexer output 204.

Multiplexer output 204 is provided as an input to register stage 213, which may be clocked by a clock signal 205. An accumulated operand 206 output from register stage 213 may be provided as an overall output of phase accumulator 200, as well as a feedback input as previously described.

In a conventional "up-accumulation", namely accumulation by adding, a point at which subtraction of modulus operand 207 effectively resets is when a current accumulated operand 206 in phase accumulator 200 exceeds such modulus operand 207 when another incremental input value, namely input operand 201, is added to it. Conventionally, this comparison is versus a fixed value for modulus operand 207, and conventionally this comparison involves a logic equation of many input bits. Along those lines, even though single signal lines are illustratively depicted for purposes of clarity, such lines may indicate one or more signal lines.

Effectively, accumulated operand 206 and modulus operand 207 are compared, and a carry-out bit 203C may be used to indicate whether a feedback accumulated operand 206 when incremented by input operand 201 exceeds a modulus operand 207. Along those lines, it should be appreciated that feedback of accumulated operand 206 is to occur on a same clock cycle as addition by adder 210, subtraction by subtractor 211, and selection by multiplexer 212. In other words, there are three logic levels that are to be completed within a single cycle of a clock, and register stages conventionally are not inserted between such logic levels because of a timing dependency with feedback of accumulated operand 206. Along those lines, accumulated operand 206 is fed back to a first of such three levels of logic, and thus such feedback is far removed from timing of input to register stage 213. This means that phase accumulator 200 may not be suitable for high-speed pipelined operation due to having to sequentially go through three levels of logic prior to reaching a register stage with a feedback timing dependency to a first of such three levels of logic. Furthermore, because multiplexer 212 follows carry chain 221, multiplexer 212 is not suitable for incorporation into such carry chain 221 to reduce the number of logic levels by one.

To recapitulate, a conventional accumulator has an add, a subtract-compare, and a select logic level all in series and all in a feedback path. This results in a large serial path of logic with a feedback path dependency, which precludes registering each of such logic levels for pipelined operation for high frequency clocking.

Described below in additional detail is a phase accumulator that may be used for pipelined operation, namely for high-speed operation, in comparison to conventional phase accumulator 200. Along those lines, phase accumulation is reengineered to provide such a phase accumulator, including without limitation reordering of phase accumulator operations. Such a phase accumulator may have single logic levels between register stages for such pipelined operation. Additionally, because such phase accumulator is not limited to a $2^N$ modulus, exact values may be provided to a lookup table with little or no truncation to reduce or eliminate phase noise. Furthermore, because multiple register stages are provided for pipelined operation, such a phase accumulator may have a latency greater than one in a single channel. In other words, multiple channels do not need to be interlaced to provide such operational parameter. Along those lines, such an accumulator is architected such that logic can be fully pipelined and non-interlaced, namely that each stage may have no more than a single layer of logic.

At the outset, because of reordering of phase accumulation operations, one logic level reduction that may be used is described as follows. In FPGAs, as well as other circuits, a subtraction or an addition operation involves a layer of logic and a carry chain as one logic level. For example, an FPGA that supports 6-input lookup tables ("LUTs") may perform comparisons with fewer bits than the width of an operand, but still a layer of logic and a carry chain are used. Because fewer bits than the width of an operand may be used, a 2:1 multiplexer located in front of, such as for feeding input to, an adder or a subtractor may be incorporated into such adder or subtractor as one logic level. In other circuits, a multiplexer in front of an adder or a subtractor may not be able to be incorporated, as described herein, namely may be two separate operations. Along those lines, such other circuits may have an extra logic level within a stage due to such limitation. The following description generally assumes use of an FPGA architecture for purposes of clarity by way of example and not limitation; however, other configurations where a leading multiplexer is not incorporated into an immediately following carry chain may be used.

For purposes of clarity by way of example and not limitation, suppose for an example a simulation of an hour hand of a clock with 12 hours in a cycle of a clock face. So, for each discrete value of a clock phase to land exactly on an hour position of a discrete clock phase position, an accumulation would be modulo-12. If modulus of a phase accumulator therefor was $2^N$, clock phase values would not be exact with respect to discrete clock phase positions of such a clock face. In a rasterized system, values in a lookup table are tailored to a modulus of accumulation. In a rasterized system, there is no truncation of LSBs, as previously described. A phase accumulator that may be tailored to non-powers of 2, as well as used for powers of 2, is described below in additional detail, and thus may be useful for a rasterized system, such as a rasterized DDS for example. A non-rasterized system uses truncation of LSBs, as previously described, and the below described phase accumulator may likewise be used in a non-rasterized system.

Continuing the example above, a lookup table may store only 12 values (i.e., assuming any savings due to symmetry are ignored) for discrete phases of a clock face. Hence, for instance, in a clock face with hours from 0 to 11 in one hour increments, when an accumulated value 11 has an input increment value of 1 added thereto, the result would normally be 12. However, for modulo-12, such result must be in the range of 0 to 11, so 12 is subtracted to yield 0. To overcome this limitation, an offset value may be added, along the lines described below. As describe below in additional detail, such offset value, which may be a preset or predetermined offset value, may effectively be added to a non-$2^N$ modulus, for example 12 in the above example, to make it a $2^N$ modulus, for example adding 4 to 12 as 16 is a power of 2 modulus, namely $2^4$. In conventional modulo-X phase accumulator 200, a comparison versus a modulus is a multi-bit operation. In contrast, by pre-adding an offset, such multi-bit comparison may be avoided. Effectively, such comparison is substantially reduced because any value greater than or equal to $2^N$ (i.e., $<2^{(N+1)}$)) is expressed by the Nth bit in an accumulated result with such offset added thereto. In short, such comparison is implicitly done as part of an accumulation.

Figure 3:
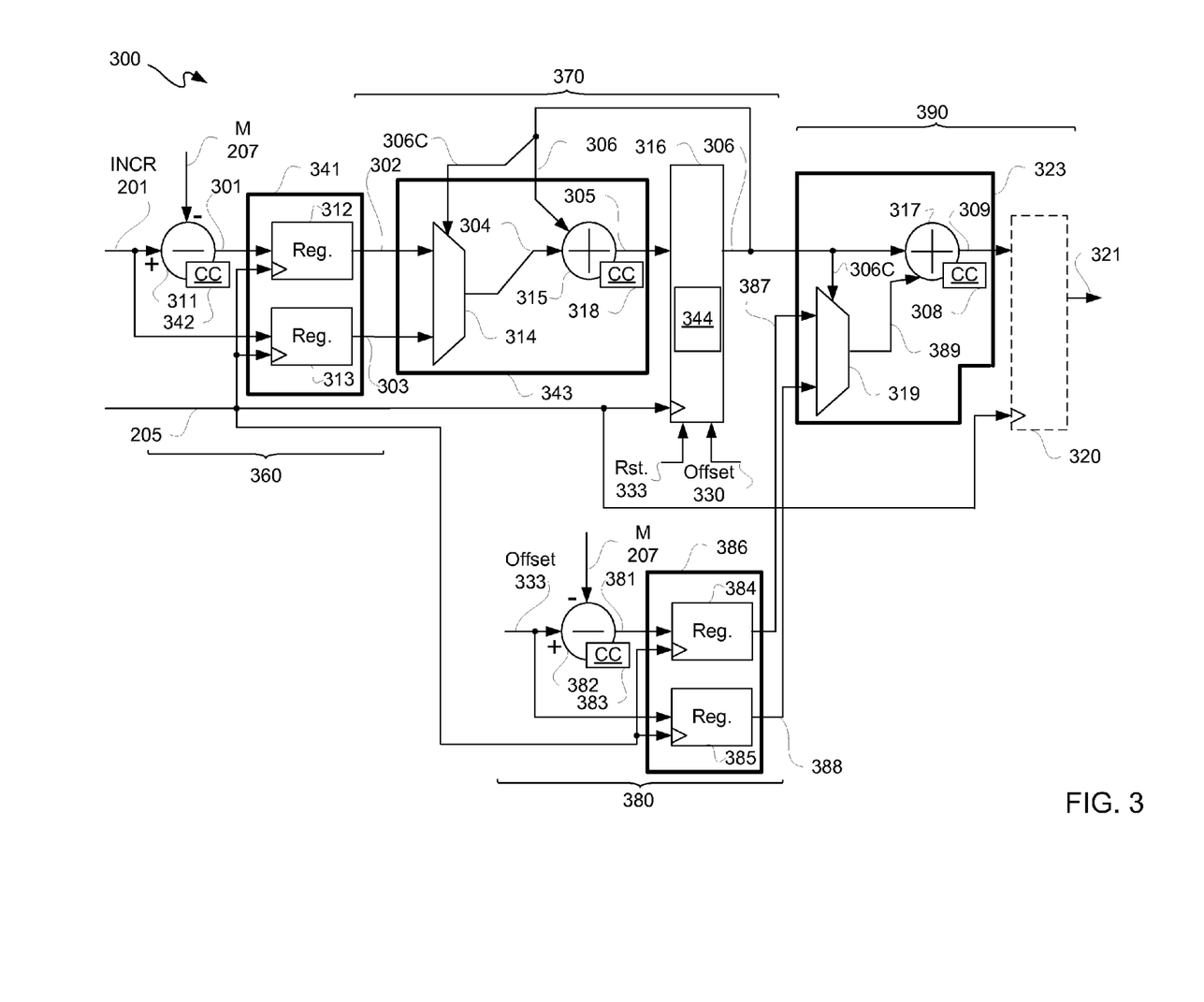
FIG. 3 is a block/circuit diagram depicting an exemplary preset-offset phase accumulator.

FIG. 3 is a block/circuit diagram depicting an exemplary preset-offset phase accumulator ("phase accumulator") 300. Even though a phase accumulator is described herein, such accumulator may be used for accumulating information other than phase information in accordance with the following description.

Before a detailed description of phase accumulator 300 is provided, it should be understood that the following description is in terms of phase accumulator 300 using a redundant number system, an example of which is a redundant binary representation ("RBR"). In a redundant number system, there is more available information (e.g., combinations of words in the system) than there is information to describe (e.g., allowed symbols). Along those lines, subtraction, addition, and carry values or operations may be in terms of an RBR, in contrast to a two's complement operation. For example, in a redundant number system, 000, 001, 110, and 111 may represent −1, 0, 0, and 1, respectively, namely $2^3$ or 8 bit patterns to describe four values or symbols. Using the clock analogy, bit patterns 1100 and 0000 may for example respectively represent 12 and 0, which both relate to a value 0. In other words, 12 is a redundant description of 0. Along those lines, combinations of binary digits may be used to represent a single number.

With reference to accumulator 300 of FIG. 3, input operand 201 is provided as an input to subtractor 311 and as an input to register 313. Input operand 201 is provided to a plus port of subtractor 311. Input operand 201 may be constrained to a range of 0 to modulus minus 1 (i.e., "modulus−1" or "M−1"), inclusive (i.e., 0 and M−1 values are included in the range), where some values outside such range may be tolerated by phase accumulator 300 (i.e., phase accumulator 300 may recover from occasional departures from such range). For purposes of clarity and not limitation, generally values outside such range may be considered invalid or illegal so as to reduce likelihood of an error. Subtractor 311 may include a carry chain 342, and subtractor 311 represents one logic level even though there are two layers of logic, namely a subtractor and a carry chain. Input operand 201 represents any value by which an accumulation is incremented. In this example, a phase increment is used. It should be understood that increments other than increments of one may be used.

Furthermore, positive increments, and some negative increments, may be used for phase increments. For example, using the clock analogy, if a phase increment of −5 hours is added to 0, which is offset by 4, the result is −1. Phase accumulator 300 may have a bit width of N−1 bits, so that it can accommodate redundant symbols, which means it has 5 bits in this example or $2^5$ or 32 bit patterns. Unfortunately, −1 in 5 bits may be 11111, which is also 31. However, 31 is not a valid symbol, because even after subtracting the offset (e.g., 4) or the offset plus modulus (e.g., 16), it does not consolidate to the range 0 to 11. Along those lines, some negative values can be tolerated while others cannot, depending on a value in phase accumulator 300.

Modulus operand 207 is provided as another input to subtractor 311, namely an input to a minus port of subtractor 311. A difference result 301 is output from subtractor 311 for input to register 312. With respect to an RBR system, it should be understood that addition and subtraction operations are "carry-save." This allows such operations to be time independent of bit width of input operands.

Registers 312 and 313 may be clocked responsive to clock signal 205. Registers 312 and 313 may form a single register stage 341. Register stage 341, as well as register stages 320 and 386, are optional. It shall be assumed that such register stages generally are present in the following description, even though such register stages are optional. Thus, for example, even though subtraction-bypass-register stages or addition-bypass-register stages are described, in other configurations such stages may respectively be subtraction-bypass and addition-bypass stages.

Outputs of registers 312 and 313 may be respectively provided as registered difference result 302 and registered input operand 303 for input to multiplexer 314. Subtractor 311, register 312 and register 313 may all be part of a phase increment and modulus subtraction-bypass-register stage 360 of phase accumulator 300.

Multiplexer output 304 of upward-accumulation stage 370 is either register difference result 302 or registered input operand 303, which may change on one clock cycle to another, responsive to selection by carry value 306C provided as a control select input to multiplexer 314. Carry value 306C may be a carry bit output from register stage 316, as described below in additional detail. Along those lines, such carry value 306C may be used to indicate whether an interim accumulated-offset phase value output from register stage 316 is inbounds or out-of-bounds with respect to a modulus.

For this example, if carry value 306C indicates an out-of-bounds value, then an interim accumulated-offset phase value output 306 from register stage 316 is outside the bounds of modulus operand 207. This is tolerated within phase accumulator 300, as such condition is consolidated in consolidation stage 390. For example, if a sign bit or carry bit 306C indicates an out-of-bounds condition, then multiplexer 314 selects a registered difference 302 for output from multiplexer 314; if, however, a sign bit or carry bit indicates an inbounds condition with respect to a modulus, then multiplexer 314 selects a registered phase increment for output.

Multiplexer output 304 is provided as an input to adder 315, and another input to adder 315 is an accumulated-offset phase value 306, including a carry value or bit therefor. Adder 315 includes a carry chain 318. Additionally, as previously indicated, a 2:1 data input multiplexer in front of an adder or a subtractor, such as is multiplexer 314 with respect to adder 315, may be incorporated into such adder. In other words, multiplexer 314 and adder 315 may be separate logic layers but may form one logic level 343.

Sum result 305 output from adder 315 may be provided as an input to register stage 316. Register stage 316 may be clocked responsive to clock signal 205. Additionally, register stage 316 may be coupled to receive a reset signal 333 and an offset value or signal or port 330. Register stage 316 may be preset or reset with an offset value 344 provided to an offset input port 330. Such offset value 344 may be an initial condition setting of register 316.

An initial or preset state value 344 may be stored in register stage 316 as an initial offset value responsive to input via offset signal 330. In other words, state of accumulator register stage 316 may have initial state value 344, where initial state value 344 is equal to a power of $2^N$ minus a modulus of phase accumulator 300, again where N is a number of bits used to express such modulus as an unsigned binary number. Continuing the clock face example, for a modulus of 12 (i.e., 1100 in binary), 4 bits may be used, so N may be set to equal 4. An initial or preset state of register stage 316 may for this example be 4, namely $2^4-12=4$. Of course, during operation, state of register stage 316 may change.

Effectively, an input accumulation may be offset on a next clock cycle so that detection of overflow is simplified by shifting the initial state of a state register, namely register stage 316, to a value such that this offset plus a modulus equals a power of 2. Thus, an overflow condition may be detected by a single bit in the result of an accumulation, such as for example a carry bit 306C of an interim accumulated-offset result.

Using a redundant representation of an accumulated value so as to remove having to consolidate in a feedback path, which may be a significant time limiting path of a phase accumulator, facilitates high-speed operation. In a conventional accumulation, the range of addition must be 0 to Modulus-1. However, phase accumulator 300 may have a range of allowed values which is twice this conventional range, namely from offset to offset+modulus*2. For example, with modulus equal to 12, a conventional accumulator must return a number from 0 to 11. In the example of phase accumulator 300 for a clock face, the range of valid values in a state register may be numbers from 4 to 27, where numbers above 16 are 'spill' values. To consolidate these numbers back to 0 to 11, consolidation stage 390 uses a top or carry bit of an accumulated value to determine whether to subtract offset or subtract offset+modulus, where offset+modulus may be $2^N$, so as to return a desired value in the range 0 to 11 for the example of a clock face. Numbers in the range of 4 to 15 for such clock face example have an offset (e.g., 4) which may be subtracted to give a number 0 to 11 which is inbounds for modulus 12. Numbers in the range of 16 to 27 for such clock face example may have offset+modulus (e.g., 4+12=16) subtracted to return them to a range of 0 to 11.

Along those lines, sum result 305 may be input to register stage 316 on a clock cycle of clock signal 205, after such register stage 316 has been preset with offset value 344. Adder 315 and register stage 316, as well as multiplexer 314, may be of an upward-accumulation stage 370. By "upward-accumulation" stage, it is generally meant an input value provided to such stage is added, registered, and a feedback value is provided for such addition in such stage.

An offset-accumulated phase operand may be output from register stage 316 responsive to a clock cycle of clock signal 205. However, offset-accumulated phase operand is offset responsive to a preset offset value 344. Offset-accumulated phase operand may thus be a sum result 305 having been input to register stage 316 on a previous clock cycle of clock signal 205 offset by a preset offset value 344. A carry value 306C of offset-accumulated phase operand is fed back to multiplexer 314 as a control select input, as previously described, and offset-accumulated phase operand 306 is fed back as a data input to adder 315 for addition with multiplexer output 304.

Stages 360 and 370 may be sequential stages for accumulation and offset of phase accumulator 300. Additionally, a negative offset and modulus subtraction-bypass-register stage 380, which may be another iteration of stage 360 except with a negative offset value or operand 333 replacing input operand 201 in such stage. Offset value 333 is just a negative value of offset value 344. Optionally, a positive offset value may be provided to a minus port of a subtractor and a minus port of a register; however, it shall be assumed that a negative of offset value 344 is obtained for purposes of clarity by way of example and not limitation. Generally, during operation of phase accumulator 300, offset value 333, as well therefore as offset value 344, and modulus operand 207 may be fixed values. Stage 380 may be operated in parallel with the sequence of stages 360 and 370. Outputs of stages 370 and 380 are provided as inputs to consolidation or output stage 390, as described below in additional detail. Thus, phase accumulator 300 may be a single channel. In other words, high-speed operation of phase accumulator 300 may be performed without interlacing channels.

Carry value 306C is also fed forward as a control select input to multiplexer 319 of consolidation stage 390. Basically, consolidation stage 390 may include multiplexer 319 and adder 317, as well as optionally output register stage 320. Consolidation stage 390 is described below in additional detail.

For stage 380, offset value 333 is provided as an input to a plus port of subtractor 382 and as an input to register 385. Subtractor 382 may include a carry chain 383, and subtractor 382 represents one logic level even though there are two layers of logic, namely a subtractor and a carry chain. Offset value 333 represents any negative value by which an offset accumulation is to be consolidated. In this example, a phase offset value is used. It should be understood that any negative offset may be used in accordance with the description herein. Additionally, if modulus operand 207 is already a power of 2 modulus, offset values 330 and 333 may both be zero.

Modulus operand 207 is provided as another input to a minus port of subtractor 382. A difference result 381 is output from subtractor 382 for input to register 384. Registers 384 and 385 may be clocked responsive to clock signal 205. Registers 384 and 385 may form a single register stage 386; however, because such register stage 386 is operated in parallel in a pipeline, except for consolidation of outputs therefrom in consolidation stage 390, no additional latency is added for such register stage 386. Outputs of registers 384 and 385 may be respectively provided as registered difference result 387 and registered offset value 388 for input to multiplexer 319. Subtractor 382, register 384 and register 385 may all be part of stage 380 of phase accumulator 300.

Adder 317 includes a carry chain 308, and such combination of logic layers is part of one logic level. Additionally, as previously indicated, a 2:1 data input multiplexer in front of a carry chain, such as is multiplexer 319 with respect to carry chain 308, may be incorporated into such carry chain. In other words, multiplexer 319 and adder 317 may be separate logic layers but may form one logic level 323.

Optionally, sum result or adder output 309, which is a consolidated accumulated result, may be provided as an input to optional register stage 320 responsive to clocking by clock signal 205 for pipelined operation. Optionally register stage 320 may be part of consolidation stage 390. Along those lines, a registered consolidated accumulated phase value 321 may be output from register stage 320 responsive to clocking by clock signal 205.

Registered difference result 387 and registered offset value 388 are provided as respective data inputs to multiplexer 319. Multiplexer output 389 from multiplexer 319 is selected responsive to carry value 306C.

Adder 317 is coupled to receive offset-accumulated phase operand 306, which includes carry value 306C. Adder 317 is further coupled to receive multiplexer output 389 for addition with offset-accumulated phase operand to provide adder output 309, namely for this example an accumulated phase value or operand 309.

For this example, if carry value 306C indicates an out-of-bounds condition, for example a carry value 306C indicates an out-of-bounds condition when a carry bit is set to logic 1 responsive to accumulated-offset phase value 306 being greater than or equal to $2^N$, then an interim accumulated-offset phase value output 306 from register stage 316 is outside the bounds of modulus operand 207. To consolidate each out-of-bounds condition, multiplexer 319 responsive to carry value 306C indicating an out-of-bounds condition, selects a registered difference value 387 for output to consolidate such out-of-bounds condition in consolidation stage 390. If, however, carry value 306C indicates an inbounds condition with respect to a modulus operand 207, then multiplexer 319 responsive to such carry value 306 selects a registered offset value 388 for output to adder 317.

Returning to the beginning of phase accumulator 300, subtractor 311 forms a first logic level of phase accumulator 300. Multiplexer 314 and adder 315 in combination form a second logic level of phase accumulator 300, and multiplexer 319 and adder 317 in combination form a third logic level of phase accumulator 300. A logic level formed by subtractor 382 is effectively hidden so as to impose no delay penalty in operation of phase accumulator 300. Thus, such logic levels appear as a single channel during operation. Additionally, registers 312 and 313 in combination form a first register stage 341 between such first logic level and such second logic level. Register stage 316 forms a second register stage between such second logic level and such third logic level. Additionally, feedback of carry value 306C is not fed all the way back to a first logic level, but rather feedback of carry value 306C is from an output of such second register stage to such second logic level. In other words, feedback of carry value 306C only crosses one register stage boundary and is fed back only one logic level, and thus such feedback, which may be of a single bit, is not a significant limitation on high-speed pipelined operation. Feedback of an offset-accumulated value 306 is fed back even less "distance" with respect to operation of phase accumulator 300 than carry value 306C. In short, phase accumulator 300 operates as a one logic level per register stage pipelined phase accumulator with only one feedback dependency which is limited to an immediately previous logic level. Generally, phase accumulator 300 may be thought of as a two stage pipeline, as an output register stage 320 is optional, and register stage 386 is effectively hidden from imposing any additional latency.

To further contrast from a conventional phase accumulator, phase accumulator 300, rather than starting a phase accumulation with an up accumulation, namely an addition operation, uses a downwards accumulation as may be performed using subtractor 311. In other words, rather than initially adding a phase increment to an accumulated phase by a phase accumulator, a phase value increment, namely input increment 201, has a modulus operand 207 subtracted from it. This avoids having feedback going from an output all the way back to an input. Along those lines, modulus operand 207 may be a fixed value, and so there is no timing dependency for such subtraction operation other than possibly optionally clocking input value 201 into stage 360.

Figure 4:
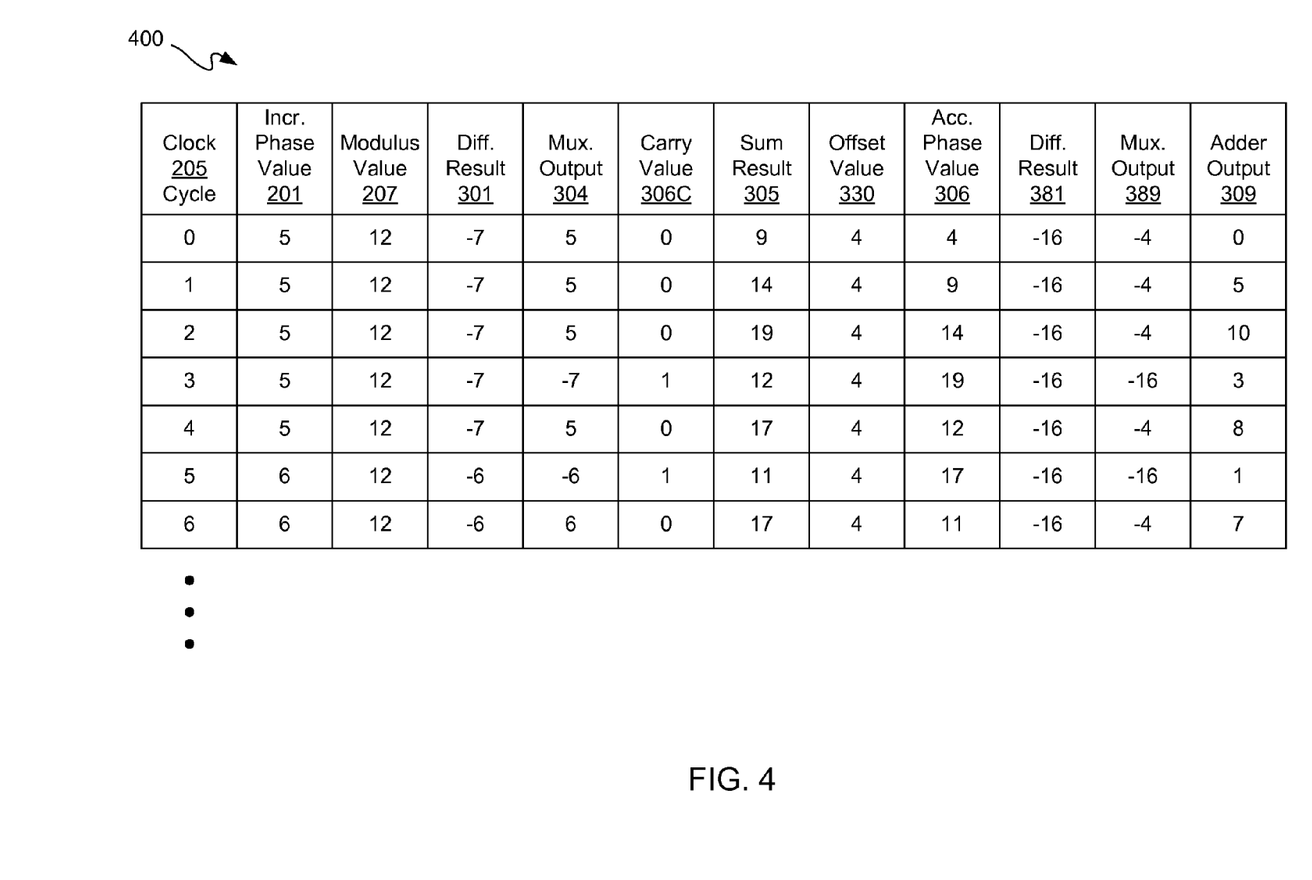
FIG. 4 is a table diagram depicting an exemplary clocked operation values table that may be used with the phase accumulator of FIG. 3.

FIG. 4 is a table diagram depicting an exemplary clocked operation values table 400 for phase accumulator 300 of FIG. 3. With simultaneous reference to FIGS. 3 and 4, table 400 is further described.

Continuing the above example of a clock face with numbers from 0 to 11, at clock cycle 0 of clock signal 205, an offset value 330 or 344 is loaded into register stage 316. For purposes of clarity by way of example and not limitation, table 400 is populated with values for the modulo-12 clock face example, and along those lines, it shall be assumed that a phase increment value of 5 and a phase offset value of 4 are used. Even though 7 clock cycles 0 through 6 are illustratively depicted, fewer or more clock cycles may be used. Modulus value 207 and offset value 330, as well as negative offset value 333 though not explicitly shown in Table 4, are fixed in this example, as these may be constant operands. Along those lines, difference result 381 will likewise be a constant value. Phase increment value 201 is changed in clock cycle 5 from a value of 5 to a value of 6. In other words, a phase increment value 201 may or may not be constant.

Figure 5:
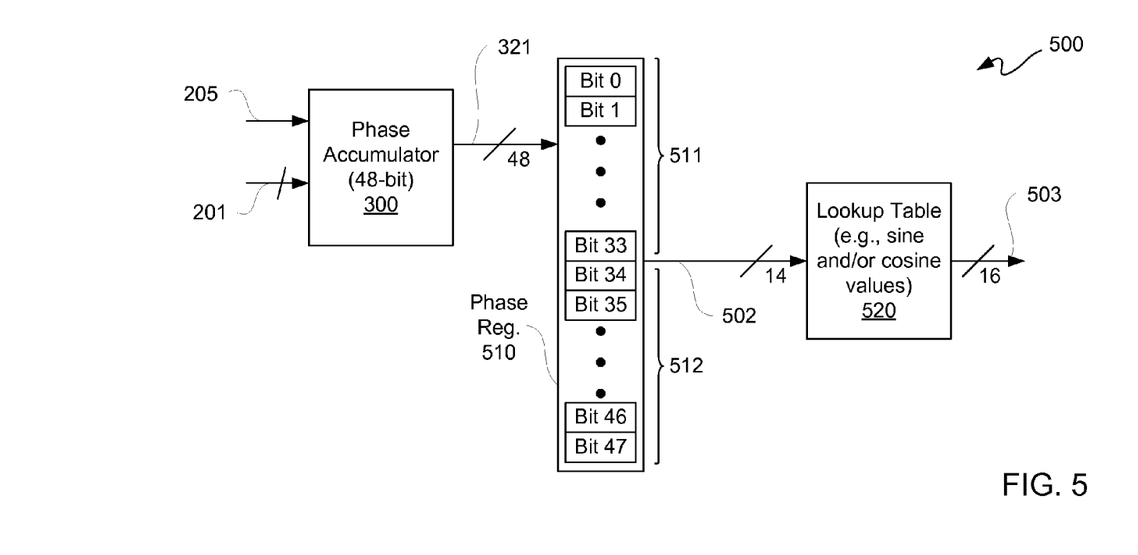
FIG. 5 is a block diagram depicting an exemplary non-rasterizing Direct Digital Synthesizer ("DDS").

FIG. 5 is a block diagram depicting an exemplary non-rasterizing DDS 500. For purposes of clarity by way of example and not limitation, bit size examples are used; however, these or other bit sizes may be used in other examples.

Phase accumulator 300, which in this example is a 48-bit phase accumulator, is coupled to receive a desired phase increment value 201 and a clock signal 205. Clock signal 205 may be a sample clock. In this configuration, phase accumulator 300 is not preset with a phase offset.

Accumulated phase output 321 may be provided as a 48-bit wide output for input to a phase register 510. Phase register 510, which may be clocked responsive to clock signal 205 though not shown here, may register such 48 bits, where LSBs 511 are truncated and MSBs 512 are output. Register output 502 from phase register 510 may for example be 14-bits for MSBs 512. A lookup table 520, which may have sinusoidal values, such as sine and/or cosine values, corresponding to phases, may be coupled to receive register output 502. Using such 14 bits output for example in register output 502, lookup table may find a corresponding sine and/or cosine value for output as lookup table output 503. In this example, such sine and/or cosine values are stored as 16-bit values, and accordingly a 16-bit value may be output for lookup table output 503.

Figure 6:
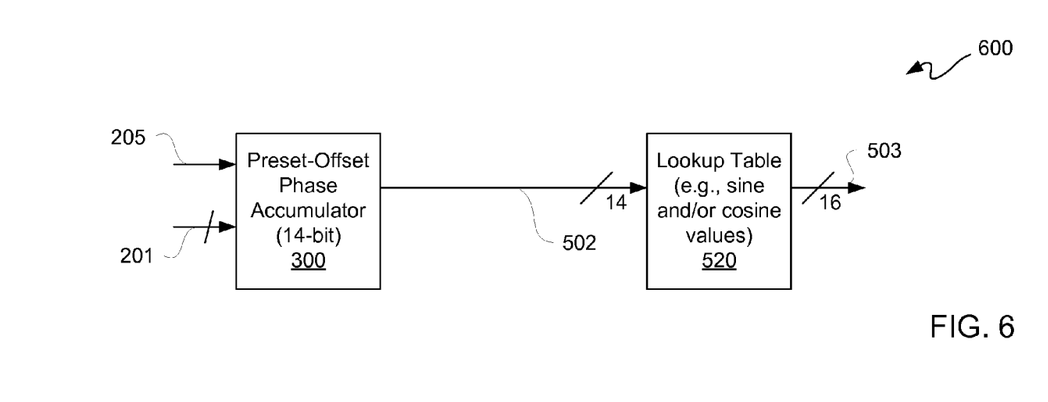
FIG. 6 is a block diagram depicting an exemplary rasterizing DDS.

FIG. 6 is a block diagram depicting an exemplary rasterizing DDS 600. For purposes of clarity by way of example and not limitation, example bit sizes are used; however, these or other bit sizes may be used in other examples. In this configuration, phase accumulator 300 is preset with a phase offset.

Phase accumulator 300, which in this example is a 14-bit phase accumulator, is coupled to receive a desired phase increment value 201 and a clock signal 205. Again, clock signal 205 may be a sample clock.

Accumulated phase output 502 may be provided as a 14-bit wide output for input to a lookup table 520, which may have sine and/or cosine values corresponding to phases. Using such 14 bits output for example, lookup table may find a corresponding sine and/or cosine value for output as lookup table output 503. In this example, such sine and/or cosine values are stored as 16-bit values, and according a 16-bit value may be output for lookup table output 503.

Figure 7:
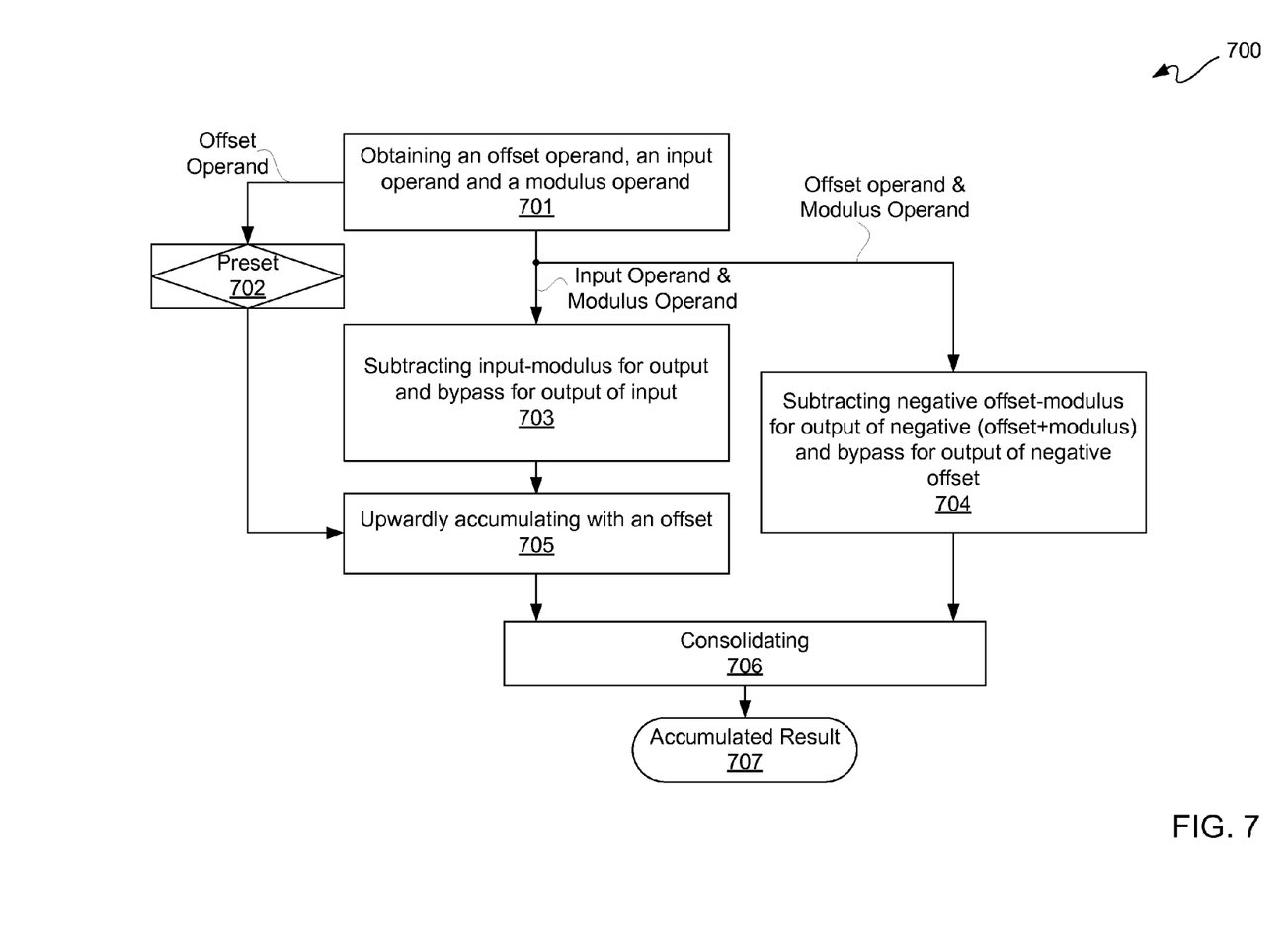
FIG. 7 is a flow diagram depicting an exemplary phase accumulation flow.

FIG. 7 is a flow diagram depicting an exemplary phase accumulation flow 700. With the above description borne in mind, phase accumulation flow 700 is further described.

At 701, an offset operand, an input operand, and a modulus operand are obtained by a phase accumulator 300. At 702, offset may be preset using such offset operand obtained at 701, such as in a register stage 316 of upward-accumulation stage 370 of phase accumulator 300. Optionally, at 702, it may be determined whether such modulus operand is a power of 2. If such modulus operand is a power of 2, then it may be determined that no presetting is to be used. If, however, it is determined at 702 that such modulus operand is not a power of 2, such presetting may be performed at 702 using such offset operand. Optionally, such offset operand may be obtained at 702, rather than 701, as such offset operand may be generated from such modulus operand. Presetting at 702 may be used for upwardly accumulating with an offset at 705.

Generally, operations after presetting at 702 are for accumulating phase information using a redundant number system for which phase accumulator 300 is configured.

At 703, a modulus operand obtained at 701 may be subtracted from an input operand, including storing both a difference between such operands and storing such input operand. In parallel with either or both operations at 703 and 705, at 704, an offset operand obtained at 701, if any, or optionally at 702, and a modulus operand obtained at 701 may be used to provide a negative of the sum of such offset operand and modulus operand, including storing both such a negative sum, or difference if a negative offset is used, between such operands and storing such a negative value of such offset operand.

From 703, at 705 upwardly accumulating with an offset may be performed to provide an offset-accumulated interim result. Such upward accumulation may use a selected one of a difference stored at 703 or an input operand stored at 703. Because of offsetting, as previously described, effectively a redundant number system may be used for such upward accumulation at 705. In other words, values stored at 703 which are out of range of a modulus operand obtained at 701 may be used or tolerated. A sign or carry value or bit determined during upward accumulation may be used to identify which of such operands are out of range of such modulus operand. Thus, an offset-accumulated interim result may or may not be out-of-range of such modulus operand. However, such out-of-range condition may be tolerated, as consolidation may be used to ensure an accumulated result is in a range of such modulus operand.

From 704 and 705, at 706 consolidation of an offset-accumulated interim result is performed. Such offset-accumulated interim result is adjusted to remove such offset. Additionally, such offset-accumulated interim result may be adjusted if it is out-of-bounds with respect to a modulus operand obtained at 701. If an offset-accumulated interim result is outside the bounds of a modulus operand obtain at 701, such offset-accumulated interim result is adjusted to be inbounds with respect to such modulus operand, as previously described. Detection of whether to adjust for modulo consistent numbering is responsive to a carry or sign value of such offset-accumulated interim result. After consolidation or adjustment(s) at 706, a consolidated accumulated result 707 may be output.

Figure 8:
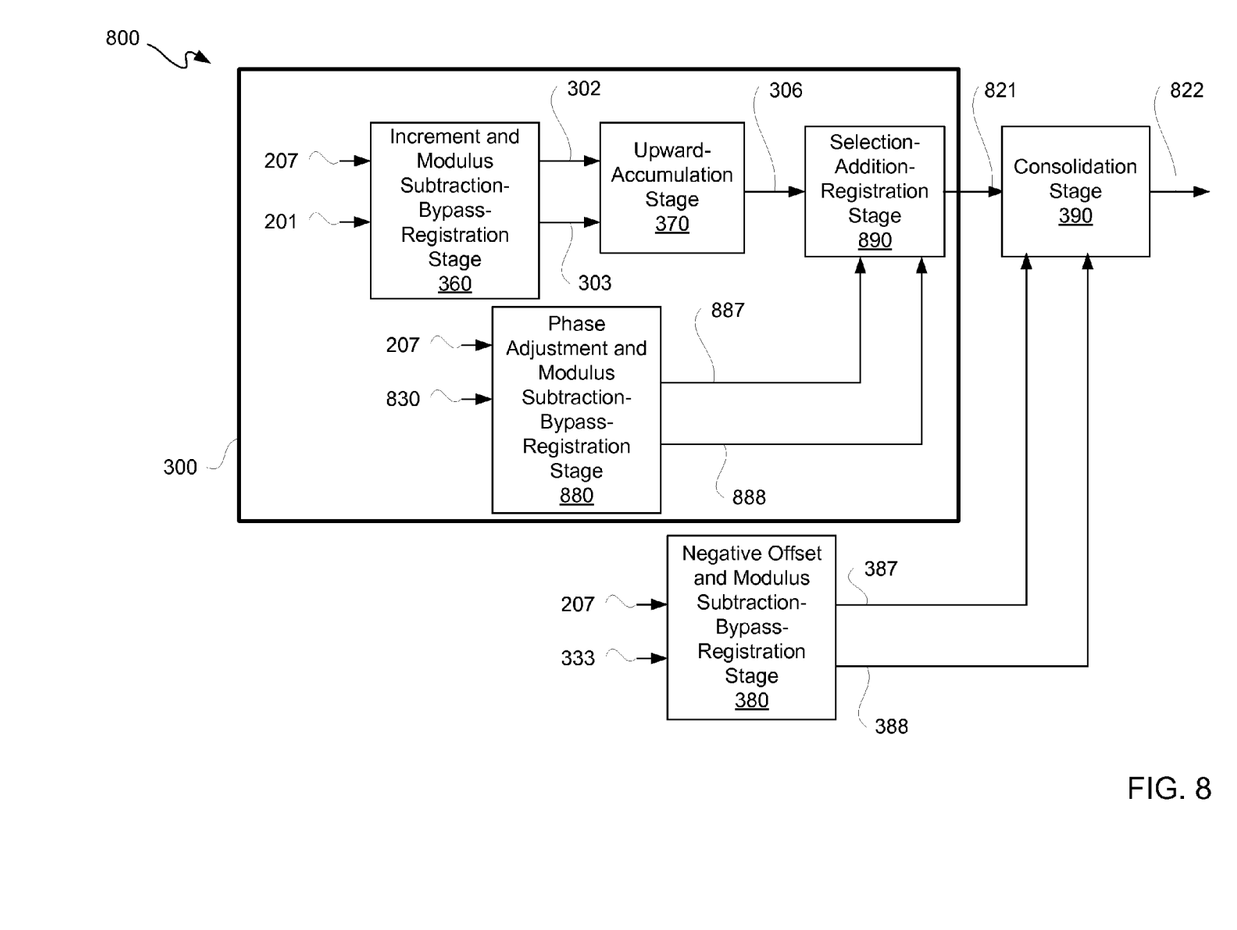
FIG. 8 is a block diagram depicting an exemplary phase modulator.

FIG. 8 is a block diagram depicting an exemplary phase modulator 800. Phase modulator 800 includes in effect phase accumulator 300, as well as a phase adjustment and modulus subtraction-bypass-register stage 880 and a selection-addition-register ("upward addition") stage 890. For clarity, clock signal 205 is not illustratively depicted in this figure; however, each of the stages depicted in this figure may be clocked with clock signal 205 as shall become more apparent from the following description.

Upwards addition stage 890, or addition and registration stage in this example as optional register 320 is assumed to be included, is the same as consolidation stage 390 of FIG. 3, except for different input as described herein. Output stage 890 receives an interim accumulated-offset phase value 306. Likewise, a carry value 306C (not shown in this figure) may be used as a multiplexer control select signal in stage 890.

Stage 880 is the same as stage 380, except a phase adjust signal or operand 830 replaces a negative offset signal 333. Effectively, negative offset and negative (offset+modulus) registered values of stage 380 are moved outside of phase accumulator 300, and stage 380 is replaced with stage 880. Phase adjust signal 830 effectively is a value of phase adjustment, namely how much an interim accumulated-offset phase value 306 is to be adjusted, such as for phase modulation. Along those lines, a difference between phase adjustment value 830, which may be a positive or a negative value, and modulus operand 207 may be determined and registered by phase adjust-accumulation stage 880 to provide a registered phase-adjustment difference signal or value 887. For purposes of clarity by way of example and not limitation, it is assumed that a positive value for phase adjustment is used, namely in a range of M−1. However, a negative value may be used, or both positive and negative values may be used such as in a feedback control manner. In other words, even though positive values have generally been used, phase accumulator 300 effectively may use the other side of the values, namely negative values. Along those lines, phase adjustment value 830, as well as input increment 201, may be in a range of 0 to 1 minus modulus (i.e., "1−modulus" or "1−M"). Thus, generally stated the sign of values in the above example of phase accumulator 300 may be flipped.

Likewise with reference to stage 380, phase adjust-accumulation stage 880 is configured to register a phase adjustment value to provide a registered phase adjustment value 888, as well as register such difference value 887. Values 887 and 888 respectively correspond to values 387 and 388 in terms of how they may be produced respectively within stages 880 and 380, though they are different values, for input into a multiplexer of upwards addition stage 890.

Output of upwards addition stage may be a phase adjusted, interim accumulated-offset phase value 821 having a carry bit. Such carry bit corresponds to carry value 306C, which may be used as a multiplexer select in consolidation stage 390, as previously described. Outputs 387 and 388 from stage 380 are provided as inputs to output stage 390, as previously described. Output of phase modulator 800, namely output of consolidation stage 390, is a phase modulated result or a modulated phase value 822.

Figure 91:
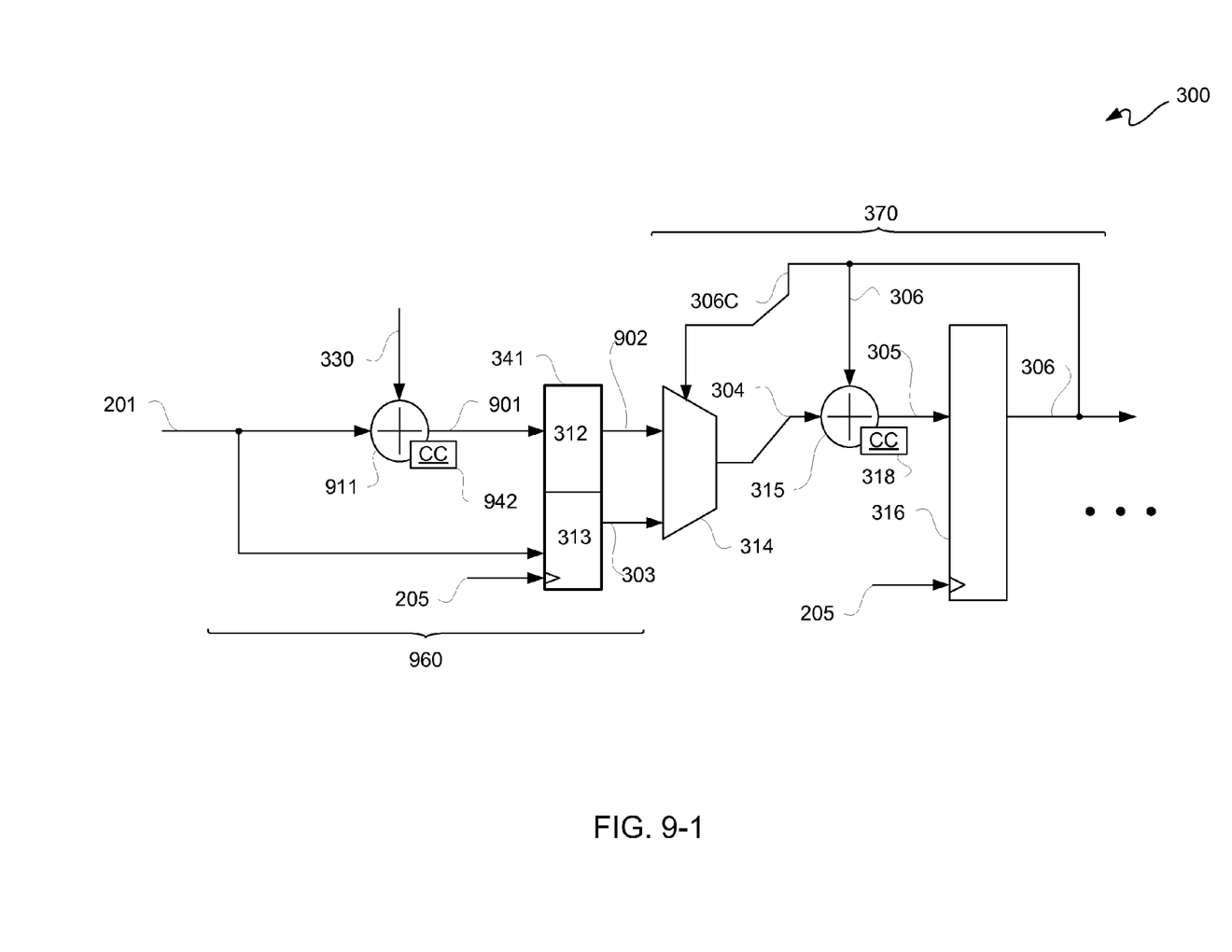

FIG. 9-1 is a block/circuit diagram depicting an exemplary portion of another phase accumulator 300. As much of phase accumulator 300 of FIG. 9-1 is the same as phase accumulator 300 of FIG. 3, generally only the differences are shown and described for purposes of clarity and not limitation. Along those lines, phase accumulator 300 likewise includes stages 370 through 390, though only stages 960 and 370 are illustratively depicted in this figure for purposes of clarity and not limitation. Stage 960, which is an addition-bypass-register stage, replaces stage 360.

In stage 960 of FIG. 9-1, modulus operand 207 provide as an input to subtractor 311 is replaced with an offset value 330 provided as an input to an adder 911. Adder 911 may include a carry chain 942. A sum result 901 may be provided by adder 911 by adding an input operand 201 provided as another input to adder 911 and offset value 330. Sum result 901 output from adder 911 may be provided as a data input to register 312 of register stage 341 for selective input to upward accumulation stage 370. Adder 911 may be bypassed by provided input operand 201 directly to register 313 of register stage 341 responsive to clock signal 205, as previously described with reference to stage 360 to bypass subtractor 311.

A registered sum result 902 output from register 312 responsive to clocking by clock signal 205 may be provided as an input to multiplexer 314. Output of registered sum result 902 from multiplexer 314 as multiplexer output 304 may be responsive to carry value 306C, if indicated that accumulated-offset phase value 306 is out-of-bounds. Otherwise, carry value 306C may be used to select registered input value 201 for output from multiplexer 314, as previously described.

Multiplexer output 304 and accumulated-offset phase value 306 are provided as inputs to adder 315; however, multiplexer output 304 is effectively subtracted from accumulated-offset phase value 306 to provide adder output 305. Thus, multiplexer output 304 may be provided to a minus port of adder 315. Along those lines, rather than a preset-offset as in phase accumulator 300 of FIG. 3, a "down-accumulate" is used in phase accumulator 300 of FIG. 9-1, where a phase increment for example is effectively subtracted from an accumulated phase. Along those lines, values of accumulated-offset phase value 306 of a negative of M−1 to 1 (e.g., −11 to −1) correspond (1:1) to values 1 to M−1, where values below 0 are "spill values." Thus, a comparison threshold value in phase accumulator 300 of FIG. 9-1 is 0, rather than 2^N as in phase accumulator 300 of FIG. 3. For example, if an input value 201 is 5 (as per table 400 for example) and accumulated-offset phase value 306 currently is at a value of 3, then 5 would be subtracted from 3 by adder 315 to give −2 as adder output 305. A sign bit, namely a minus sign here, of carry value 306C would cause multiplexer 314 to select registered sum result 902 on the subsequent cycle, which sum result 902 may be −7 (e.g., 5 minus a modulus of 12 equals −7). In this configuration, subtracting −7 is equivalent to adding 7, so the next value of accumulated-offset phase value 306 will be +5 in this example. All together this gives a sequence on accumulated-offset phase value 306 of 3, −2, and 5. Once consolidated (i.e., subtract from modulus for positive values and subtracted from 0 for spill values), this produces adder output 309 values of phases of 9, 2, and 7, respectively. In other words, from 9 o'clock, a phase shift of 5 yields 2 o'clock, and from 2 o'clock, a phase shift of 5 yields 7 o'clock.

In this configuration, register stage 316 is not preset or preloaded with an offset value. Furthermore, input operand 201, as well as an offset value 330, may be directly provided to adder 911 instead of a subtractor 311.

Figure 92:
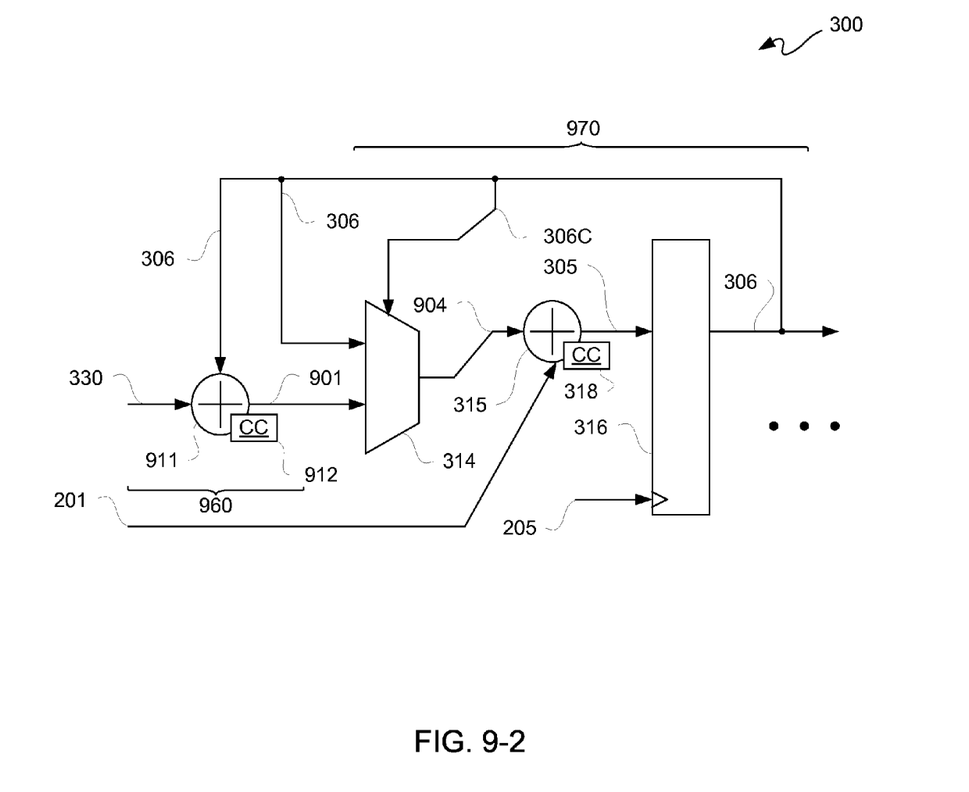

FIG. 9-2 is a block/circuit diagram depicting an exemplary portion of another phase accumulator 300. As much of phase accumulator 300 of FIG. 9-2 is the same as phase accumulator 300 of FIG. 3, so generally only the differences are shown and described for purposes of clarity and not limitation. Along those lines, phase accumulator 300 likewise includes stages 380 and 390 (though not shown in this figure). Phase accumulator 300 of FIG. 9-2 may generally be thought of as a "3-input add" accumulator.

Stage 360 of FIG. 3 is replaced with stage 960. Stage 960 is an upward-accumulation stage having an adder 911. Adder 911 may include a carry chain 912. Inputs to adder 911 are offset 330 and accumulated-offset phase value 306. A sum result 901 output from adder 911 may be provided as a data input to multiplexer 914 of upward accumulation stage 970.

Stage 970 replaces stage 370 of FIG. 3. Stage 970 likewise includes multiplexer 314, adder 315, and register stage 316.

Accumulated-offset phase value is provided as a data input to multiplexer 314, and carry value 306C is provided as a control select input to multiplexer 314. Output 904 of multiplexer 314 is provided as an input to adder 315. Adder 315 includes carry chain 318 to which multiplexer 314 may be incorporated to provide a single logic level, as previously described. Another input to adder 315 is input operand 201. Output of a sum result 305 from adder 315 may be provided as an input to register stage 316. Register stage 316 may output interim accumulated-offset phase value 306 responsive to clock signal 205. When an accumulated value (i.e., accumulated-offset phase value 306) goes out of range, as indicated by the MSB (i.e., carry value 306C) being set, such fed back MSB (e.g., a topmost bit of accumulated-offset phase value 306) is reset, and an offset value 330 is added to such fed back value (i.e., accumulated-offset phase value 306). Otherwise, accumulated-offset phase value 306 may be fed back without modification. Carry value 306C may be reset (e.g., forced to zero) before accumulated-offset phase value 306 is input to adder 911.

In this configuration, register stage 316 is preset or preloaded with an offset value. Furthermore, input value 201 may be directly provided to adder 315. Multiplexer 314 selects sum result 901 for output 904 responsive to carry value 306 indicating an out-of-bounds condition for an output interim accumulated-offset phase value 306, and multiplexer 314 selects carry value 306 for output 904 responsive to carry value 306 indicating an inbounds condition for an output interim accumulated-offset phase value 306.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
   a first subtraction-bypass circuit coupled to receive an input operand and a modulus operand to provide a first difference and the input operand;
   an accumulation circuit coupled to the first subtraction-bypass circuit to receive the first difference and the input operand;
   wherein the accumulation circuit is coupled to receive an offset operand for providing an offset-accumulated result;
   a second subtraction-bypass circuit coupled to receive the offset operand and the modulus operand to provide a second difference and the offset operand; and
   a consolidation circuit coupled to receive the offset operand, the second difference and the offset-accumulated result to provide a consolidated accumulated result;
   wherein the first subtraction-bypass circuit, the accumulation circuit, the second subtraction-bypass circuit, and the consolidation circuit are for a redundant number system.

2. The apparatus according to claim 1, wherein the first subtraction-bypass circuit comprises:
   a first subtractor coupled to determine the first difference as between the input operand and the modulus operand; and
   a first register circuit coupled to register the input operand and the first difference to provide a registered input operand and a first registered difference, respectively, to the accumulation circuit.

3. The apparatus according to claim 2, wherein the accumulation circuit comprises:
   a first multiplexer coupled to select between the first registered difference and the registered input operand responsive to a carry value;
   a first adder coupled to add the offset-accumulated result with the first registered difference or the registered input operand selected to provide a first sum; and
   a second register circuit to register the first sum to provide the offset-accumulated result.

4. The apparatus according to claim 3, wherein the first multiplexer is incorporated into a carry chain of the first adder.

5. The apparatus according to claim 3, wherein
   the second register circuit is coupled to receive the offset operand; and
   the carry value provided to the first multiplexer is sourced from the offset-accumulated result.

6. The apparatus according to claim 5, wherein the second subtraction-bypass circuit comprises:
   a second subtractor coupled to determine the second difference as between a negative of the offset operand from which the modulus operand is subtracted to provide the second difference; and
   a third register circuit coupled to register the negative of the offset operand and the second difference to provide a registered offset operand and a second registered difference, respectively.

7. The apparatus according to claim 6, wherein the consolidation circuit comprises:
   a second multiplexer coupled to select between the second registered difference and the registered offset operand responsive to the carry value; and
   a second adder coupled to add the offset-accumulated result with the second registered difference or the registered offset operand selected to provide a second sum.

8. The apparatus according to claim 7, wherein the second multiplexer is incorporated into a carry chain of the second adder.

9. The apparatus according to claim 7, further comprising:
   a third subtraction-bypass-register circuit coupled to receive a phase adjustment operand and the modulus operand to provide a third registered difference and a registered phase adjustment operand; and
   an addition-register circuit coupled to receive the registered phase adjustment operand, the third registered difference and the offset-accumulated result to provide the offset-accumulated result with a modulated phase for input to the consolidation circuit;
   wherein the consolidated accumulated result output from the consolidation circuit has the modulated phase.

10. The apparatus according to claim 1, wherein each of the first subtraction-bypass circuit, the accumulation circuit, and the consolidation circuit include only one logic level.

11. The apparatus according to claim 1, wherein each of the first subtraction-bypass circuit, the accumulation circuit, the second subtraction-bypass circuit, and the consolidation circuit include only one logic level.

12. The apparatus according to claim 1, wherein the first subtraction-bypass circuit, the accumulation circuit, the second subtraction-bypass circuit, and the consolidation circuit are respectively associated with register circuits of a pipeline.

13. The apparatus according to claim 12, wherein the second subtraction-bypass circuit is coupled for parallel operation with a sequence of the first subtraction-bypass circuit and the accumulation circuit.

14. The apparatus according to claim 1, wherein the redundant number system is for a redundant binary representation.

15. The apparatus according to claim 1, wherein:
   the apparatus is a phase accumulator with a bit width of N for N a positive integer; and
   the modulus operand is not a $2^N$ modulus.

16. The apparatus according to claim 15, wherein the modulus operand offset with the offset operand provides a $2^N$ modulus for N a positive integer.

17. The apparatus according to claim 1, further comprising:
   a phase register coupled to receive the consolidated accumulated result;
   wherein the phase register is configured to truncate least significant bits of the consolidated accumulated result and to output most significant bits of the consolidated accumulated result; and
   a lookup table coupled to receive the most significant bits output to provide a sinusoidal value therefor.

18. The apparatus according to claim 1, further comprising a lookup table coupled to receive the consolidated accumulated result to provide a sinusoidal value therefor.

19. An apparatus, comprising:
- an addition-bypass circuit coupled to receive an input operand and an offset operand to provide a sum and the input operand;
- an accumulation circuit coupled to the addition-bypass circuit to receive the sum and the input operand to provide an offset-accumulated result;
- a subtraction-bypass circuit coupled to receive the offset operand and a modulus operand to provide a difference and the offset operand; and
- a consolidation circuit coupled to receive the offset operand, the difference and the offset-accumulated result to provide a consolidated accumulated result;
- wherein the addition-bypass circuit, the accumulation circuit, the subtraction-bypass circuit, and the consolidation circuit are for a redundant number system.

20. An apparatus, comprising:
- a first accumulation circuit coupled to receive an offset operand and a carry value fed back to provide a first sum result;
- a second accumulation circuit coupled to the first accumulation circuit to receive the first sum result;
- wherein the second accumulation circuit is configured to select between the first sum result and the carry value fed back responsive to the carry value to provide a first input to an adder;
- wherein the second accumulation circuit is coupled to receive an input operand as a second input to the adder to provide a second sum result;
- wherein the second accumulation circuit includes a register circuit to register the second sum result to provide an offset-accumulated result;
- a subtraction-bypass-register circuit coupled to receive the offset operand and a modulus operand to provide a registered difference and a registered offset operand; and
- a consolidation circuit coupled to receive the registered offset operand, the registered difference and the offset-accumulated result to provide a consolidated accumulated result.

* * * * *